US010846412B2

(12) United States Patent
Adams et al.

(10) Patent No.: US 10,846,412 B2
(45) Date of Patent: Nov. 24, 2020

(54) ELECTRONIC DEVICE INCLUDING DISPLAY AND METHOD OF ENCRYPTING AND DECRYPTING INFORMATION

(71) Applicant: BlackBerry Limited, Waterloo (CA)

(72) Inventors: Neil Patrick Adams, Waterloo (CA); Geordon Thomas Ferguson, Mississauga (CA); Daniel Jonas Major, Ottawa (CA)

(73) Assignee: BlackBerry Limited, Waterloo (CA)

( * ) Notice: Subject to any disclaimer, the term of this patent is extended or adjusted under 35 U.S.C. 154(b) by 313 days.

(21) Appl. No.: 15/812,758

(22) Filed: Nov. 14, 2017

(65) Prior Publication Data

US 2019/0147169 A1 May 16, 2019

(51) Int. Cl.

| | |
|---|---|
| ***G06F 21/60*** | (2013.01) |
| ***G06F 21/84*** | (2013.01) |
| ***G06F 21/62*** | (2013.01) |
| ***G06F 3/0488*** | (2013.01) |
| *G06F 3/0484* | (2013.01) |
| *G06F 3/0486* | (2013.01) |
| *G06F 3/0481* | (2013.01) |

(52) U.S. Cl.

CPC ........ *G06F 21/602* (2013.01); *G06F 3/04883* (2013.01); *G06F 21/6245* (2013.01); *G06F 21/84* (2013.01); *G06F 3/0486* (2013.01); *G06F 3/04817* (2013.01); *G06F 3/04842* (2013.01)

(58) Field of Classification Search

CPC .... G06F 21/602; G06F 21/6245; G06F 21/84; G06F 3/04817; G06F 3/048842; G06F 3/04883

USPC .......................................................... 713/189

See application file for complete search history.

(56) References Cited

U.S. PATENT DOCUMENTS

| | | | | |
|---|---|---|---|---|
| 6,178,243 | B1 | 1/2001 | Pomerantz et al. | |
| 8,347,398 | B1 * | 1/2013 | Weber | G06F 21/85 713/189 |
| 8,542,823 | B1 | 9/2013 | Nguyen et al. | |
| 9,665,501 | B1 * | 5/2017 | Obukhov | G06F 21/00 |
| 2003/0070083 | A1 * | 4/2003 | Nessler | G06F 21/80 713/193 |
| 2003/0081785 | A1 | 5/2003 | Boneh et al. | |

(Continued)

FOREIGN PATENT DOCUMENTS

WO 2017034378 A1 3/2017

OTHER PUBLICATIONS

NPL Search Results (Year: 2019).*

(Continued)

*Primary Examiner* — Syed A Zaidi

(74) *Attorney, Agent, or Firm* — Borden Ladner Gervais LLP; Todd Keeler

(57) ABSTRACT

A method of applying information on the display of the electronic device includes displaying content elements associated with an application running on the electronic device on a display of the electronic device, receiving a selection of a content element associated with the application running on the electronic device, determining an identity profile having an associated key, encrypting information associated with the selected content element utilizing the key associated with the determined identity profile to generate encrypted information, displaying the encrypted information in the selected content element.

34 Claims, 10 Drawing Sheets

(56) References Cited

U.S. PATENT DOCUMENTS

| | | | | |
|---|---|---|---|---|
| 2003/0208680 | A1* | 11/2003 | Byrne | G06F 21/10 713/179 |
| 2005/0063002 | A1* | 3/2005 | Sugahara | G06F 21/608 358/1.15 |
| 2005/0246526 | A1 | 11/2005 | Forlenza et al. | |
| 2006/0005017 | A1 | 1/2006 | Black et al. | |
| 2007/0113078 | A1 | 5/2007 | Witt et al. | |
| 2007/0156836 | A1 | 7/2007 | Kelso et al. | |
| 2008/0168277 | A1 | 7/2008 | Forlenza et al. | |
| 2010/0275021 | A1* | 10/2010 | Kristiansen | H04L 9/0836 713/171 |
| 2011/0054875 | A1* | 3/2011 | Chang | G06F 30/367 703/14 |
| 2011/0302405 | A1 | 12/2011 | Marlow et al. | |
| 2013/0318347 | A1 | 11/2013 | Moffat et al. | |
| 2014/0298479 | A1 | 10/2014 | Stass et al. | |
| 2015/0007351 | A1 | 1/2015 | Janajri et al. | |
| 2016/0171227 | A1* | 6/2016 | Margolin | G06F 21/606 713/165 |
| 2016/0294785 | A1 | 10/2016 | Lim et al. | |
| 2018/0239754 | A1* | 8/2018 | Chung | G06F 17/2775 |

OTHER PUBLICATIONS

NPL Search Results (Year: 2020).*

International Patent Application No. PCT/CA2018/051349, International Search Report and Written Opinion dated Jan. 28, 2019.

European Patent Application No. 18878848.3, Extended European Search Report dated Jul. 29, 2020.

* cited by examiner

ELECTRONIC DEVICE INCLUDING DISPLAY AND METHOD OF ENCRYPTING AND DECRYPTING INFORMATION

FIELD OF TECHNOLOGY

The present disclosure relates to encrypting and decrypting information on a display of an electronic device.

BACKGROUND

Electronic devices, have gained widespread use and may provide a variety of functions including, for example, telephonic, electronic messaging and other personal information manager (PIM) application functions. Electronic devices include several types of devices including mobile stations such as simple cellular telephones, smart telephones, wireless PDAs, and computers.

Such electronic devices are often able to display various types of information to a user. In some situations, protection of the information displayed to inhibit viewing by others near the electronic device that is displaying the information is desirable. In other situations, protection of information sent from the electronic device such that only an intended recipient electronic device may view the information is desirable. Encryption of sensitive data may be utilized to protect sensitive data from being viewed by someone other than those intended to have access to the information.

Improvements in protection of such information are desirable.

BRIEF DESCRIPTION OF THE DRAWINGS

Embodiments of the present disclosure will now be described, by way of example only, with reference to the attached figures, in which.

DETAILED DESCRIPTION

Figure 1:
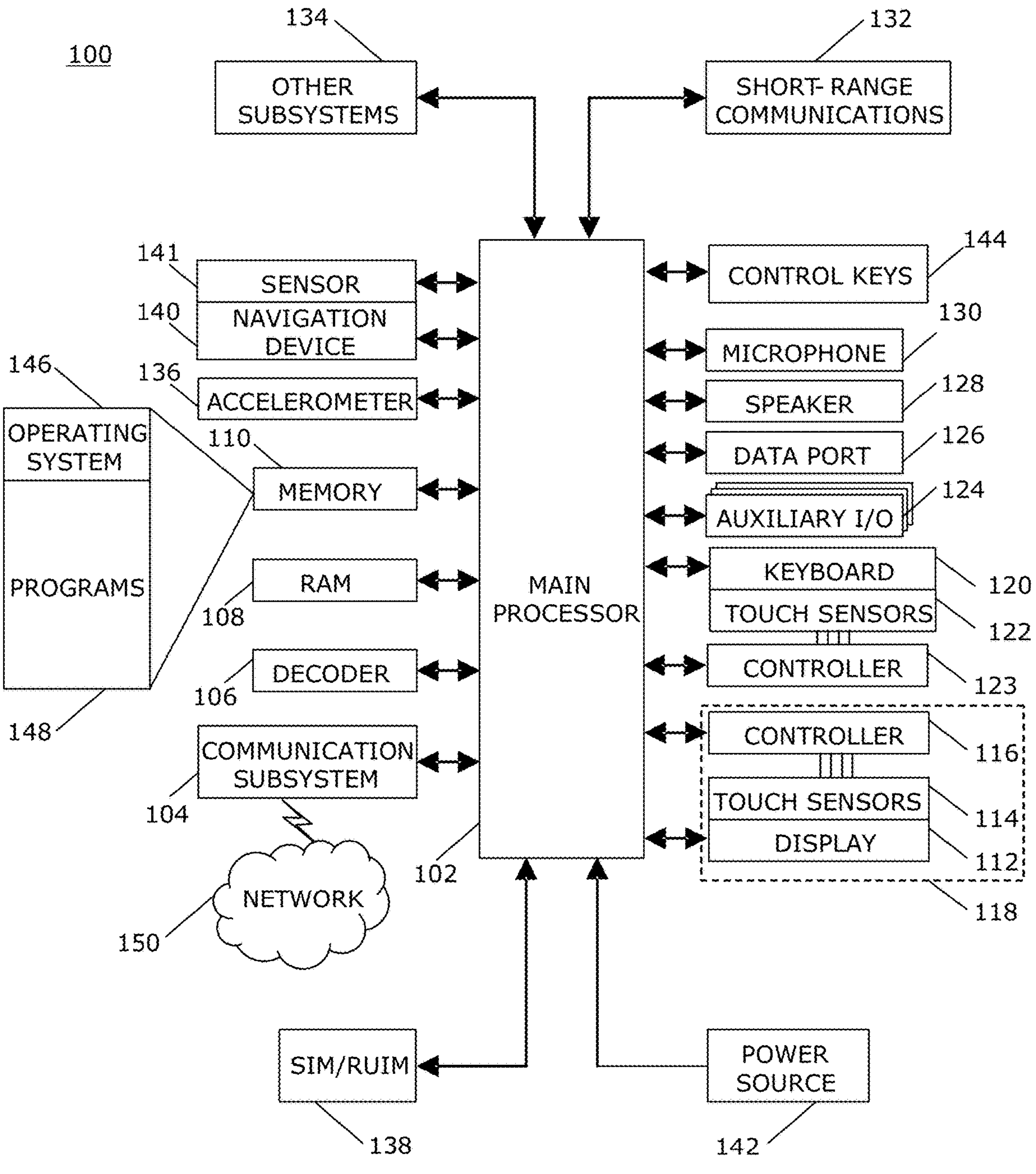
FIG. 1 is a block diagram of a portable electronic device in accordance with the present disclosure.

The following describes an electronic device including a display and a method of encrypting information displayed on the display of the electronic device. The method includes displaying content elements associated with an application running on the electronic device on a display of the electronic device, receiving a selection of a content element associated with the application running on the electronic device, determining an identity profile having an associated key, encrypting information associated with the selected content element utilizing the key associated with the determined identity profile to generate encrypted information, and displaying the encrypted information in the selected content element.

The following also describes an electronic device including a display and a method of decrypting encrypted information displayed on the display of the electronic device. The method includes displaying a content element associated with an application running on the electronic device, the content element including encrypted information, receiving a selection of the content element, determining an identity profile having an associated key, decrypting the encrypted information utilizing the key associated with the determined identity profile to generate decrypted information, and displaying the decrypted information.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device. Examples of electronic devices include mobile, or handheld, wireless communication devices such as cellular phones, cellular smart-phones, wireless organizers, personal digital assistants, computers, tablet computers, mobile internet devices, electronic navigation devices, and so forth.

A block diagram of one example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for hands-free use.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. In addition, the keys of the keyboard include touch sensors 122 coupled to a controller 123 to detect touch input thereon. The controller may be a keyboard controller 123 as illustrated in FIG. 1. Alternatively, the keys of the keyboard 120 may be coupled to the controller 116 utilized to detect touches using the touch sensors 114 of the touch-sensitive display 118.

The processor 102 also interacts with a plurality of control keys 144 and a navigation device 140. The control keys 144 may include, for example, a send key, a menu key, an escape key, an end key, or any other suitable control keys. The navigation device 140 may be a touch-sensitive track pad, an optical joystick, or any other suitable navigation device to interface with a user to provide input. The navigation device 140 may be utilized, for example, to navigate or scroll through information on a display, control a cursor or other indicator, edit information, and so forth.

The processor 102 also interacts with a biometric sensor 141 for obtaining data to authenticate a user. The biometric sensor 141 may be a fingerprint sensor disposed on the navigation device for detecting a touch thereon and obtaining fingerprint data upon receipt of a touch on the navigation device. Other biometric sensors may also be successfully implemented. For example, an iris scanner or other suitable detector may be utilized for the purpose of authenticating a user.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the keyboard may be any suitable touch sensors, such as capacitive touch-sensors and may comprise any suitable material, such as indium tin oxide (ITO). Optionally, the touch sensors 122 disposed on the keyboard 120 may be coupled to the same controller 116 as the touch sensors of touch-sensitive display 118 such that a single controller is utilized rather than two controllers 116, 123.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected utilizing the touch sensors 122 disposed on the keyboard 120. A gesture on the keys of the keyboard 120 may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

In some instances, a user may wish to encrypt sensitive data that may be stored on the electronic device 100 or transmitted in association with an application, including, for example, text messaging applications, email applications, notes applications, calendar applications, and contacts applications. An issue with current electronic devices is that not all applications include security measures, such as encryption, in order to protect sensitive data. Additionally, for applications that include encryption functionality, generally different applications utilize different encryption keys to encrypt the data, meaning that sharing data from various applications requires also sharing the various associated encryption keys.

In order to overcome at least some of the issues of present electronic devices, the present disclosure provides an electronic device and method of encrypting and decrypting information displayed on the electronic device in a manner that is separate from the application that the displayed information is associated with.

Figure 2:
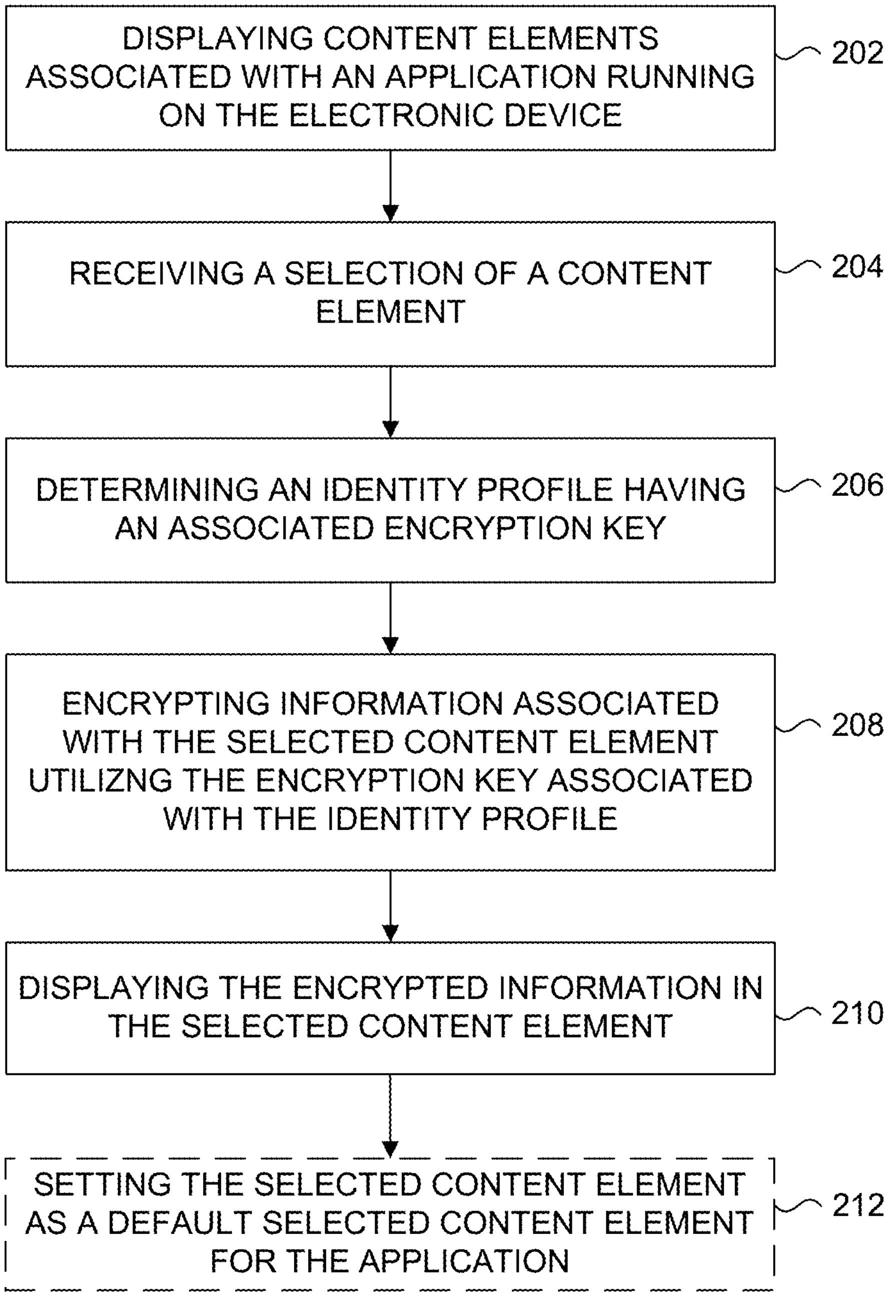
FIG. 2 is a flowchart illustrating a method of encrypting information in accordance with the present disclosure.

A flowchart illustrating a method of encrypting information displayed on an electronic device, such as the portable electronic device 100, is shown in FIG. 2. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor, such as the processor 102, of the portable electronic device to perform the method may be stored in a computer-readable storage medium, such as a non-transitory computer-readable medium. The computer-readable code may be incorporated into an operating system, such as operating system 146, or may be incorporated into a stand-alone application, such as one of the programs 148, or may be a functionality built into a secured vault on the electronic device, such as a secured password database.

At 202, content elements associated with an application running on the electronic device are displayed on the display. An application may be considered "running on the electronic device" if, for example, the application has been opened, or launched, on the electronic device and is the application that is in focus, or active, on the electronic device. The application may be any suitable application including, for example, a text messaging application, an email application, a notes application, a calendar application, and a contacts application.

The content elements are the components of the application that are displayed on the display, and may depend upon the particular application that is running on the electronic device. For example, the content elements associated with a text messaging application may include a text entry field for inputting text characters for a message to be sent, as well as previous messages that have been sent in a particular conversation thread. In another example, the content elements associated with a contacts application may include the various information fields associated with a particular contact such as, for example, name, address, telephone number, mailing address, email address, and notes.

Each content element may have information associated with it. For example, the information associated with a previous message of a conversation thread in a text messaging application is the text that was sent in the previous message. In another example, the information associated with an information field in a contacts application may be any text that is included in that field, such as the contact's email address included in an email address field.

At 204, a selection of a content element is received. Any suitable method for selecting a content element may be utilized. Selecting a content element may be performed when the electronic device has entered an encryption mode. Encryption mode may be entered in response to any suitable input such as, for example, selecting an enter encryption mode button from a command menu or performing a predefined gesture on a touch-screen of the electronic device.

Entering into an encryption mode prior to encrypting or decrypting information may include performing authentication of the user of the electronic device by, for example, prompting the user to enter a password, or utilizing fingerprint or some other biometric verification.

In an example, selecting a content element may include dragging an icon, or lens, that is displayed on the display to a location associated with a content element. In another example, a content element may be selected by receiving a clicking or tapping input at a location of the display associated with the content element.

In another example, selecting a content element may be include defining a region of the display, and selecting all of the content elements within, or partially within, that defined region. Defining a region of the display may be performed by, for example, dragging a filter from an edge of the screen towards center of the screen, such that the portion of the display covered by the filter defines the region. Dragging the filter may be performed by sliding gesture that starts near an edge of the display and moves away from the edge, or by any other suitable input. The region may be defined as the portion of the screen beginning at the edge of the display that the sliding gesture starts near and ending at the end of the sliding touch gesture. In another example, the region may be defined without displaying the filter, such that the region is defined as, for example, the portion of the display lying in the distance between the edge of the display and the end point of the sliding gesture. In another example, the region may be defined by any other suitable gesture other than a sliding gesture such as, for example, a spreading gesture performed on a touch-sensitive display.

In another example, a content element may be selecting by a user selecting all or a portion of the information displayed in association with a content element, similar to selecting information for a cut/paste/copy function. Selecting the information may cause the selected information to be highlighted and may cause a cut/paste/copy menu to be displayed. The cut/paste/copy menu may include, for example, a selectable feature associated with an encryption function such that selection of the content element associated with the selected information may be received in response to the user selecting the encryption selectable feature from the cut/paste/copy menu.

At 204, an identity profile having an associated encryption key is determined. A plurality of identity profiles may be stored on the electronic device. Each identity profile may include a unique identifier to identify the different identity profiles, and a unique encryption key that may be utilized to encrypt and decrypt data. An identity profile may be a primary identity profile or a shared identity profile.

A primary identity profile is the identity profile associated with the primary user of the electronic device. The encryption key associated with the primary identity profile may be utilized to encrypt and decrypt data that is intended to be accessible only by the primary user of the electronic device. The primary identity profile may include security settings that prevent the primary identity profile from being shared with, or viewed by, other electronic devices or other users.

A shared identity profile may be associated with a user, or group of users, other than the primary user of the electronic device. A shared identity profile is intended to be shared with electronic devices of another user or group of users. The shared identity profile may be shared with the electronic devices of the other user or users by any suitable method including, for example, near field communication (NFC), and by displaying a barcode on the display of one electronic device that may be scanned by the electronic device of the other user or users.

The identity profiles may be stored on the electronic device in, for example, a secured vault, such as a secured password database, in order to inhibit unauthorized access to the stored identity profiles.

Figure 3B:
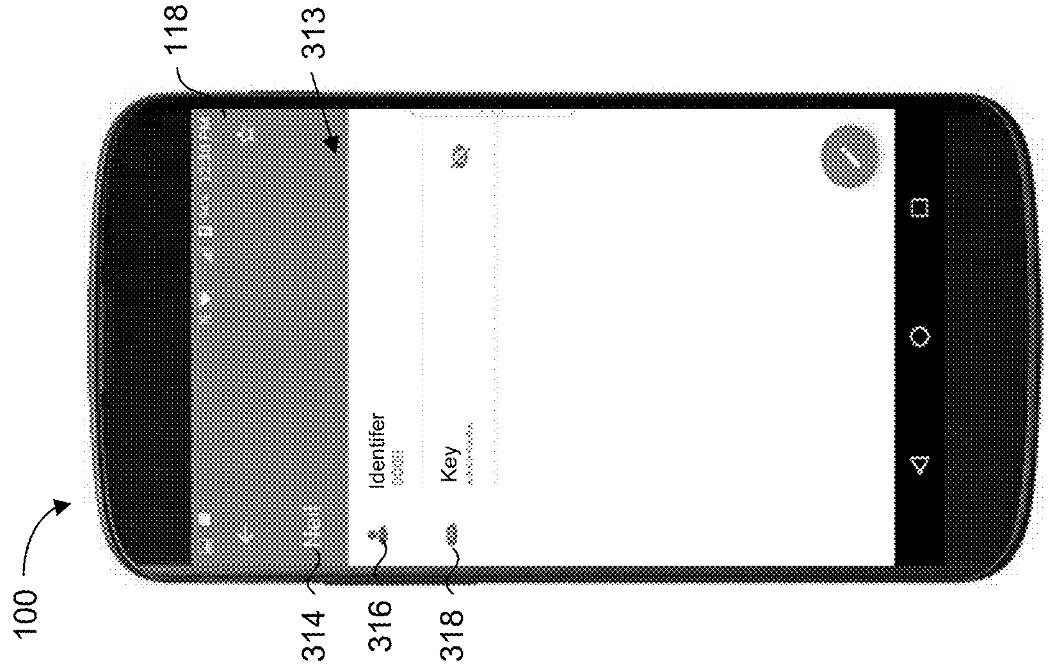
FIGS. 3A and 3B illustrate an example of displaying identity profiles in accordance with the disclosure.
Figure 3A:
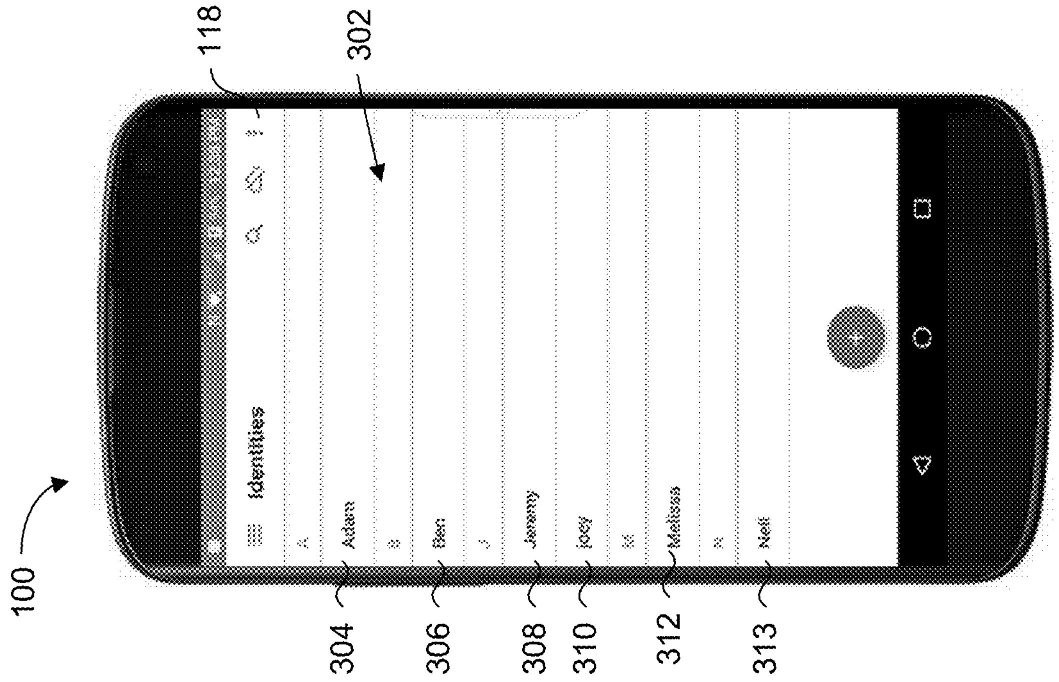

Referring to FIGS. 3A and 3B, an example of various identity profiles stored on an electronic device 100 is shown. FIG. 3A shows a list 302 of the various identity profiles 304 through 313 that is displayed on a touch-sensitive display 118 of the electronic device 100. FIG. 3B shows a display of the one identity profile, identity profile identity 313 from the list 302 of FIG. 3A. The profile identity 313 includes a title 314 associated with, for example, the user or group of users associated with the identity profile 313 and with whom the identity profile is shared. In this case, the title indicates that the identity profile is associated with "Neil". The identity profile 313 also includes an identifier 316, and an encryption key 318. The identity profile 313 may also include other information (not shown) in addition to the title 314, the identifier 316, and the encryption key 318, such as, for example, contact details associated with the user, or group of users, associated with the identity profile, and the type of the identity profile, i.e. either primary or shared.

The identifier 316 in the example shown is a four digit number that uniquely identifies the identity profile 313. When the encryption key 318 is utilized to encrypt data, the encrypted data includes this four digit number in order to identify the encryption key that is needed to decrypt the encrypted data. Although the example shows a four digit identifier 316, a greater or fewer number of digits may be utilized to provide a unique identifier for each identity profile, depending on the number of identity profiles that are desired. In the example shown, the identifier 316 is "0000" which may indicated that the identity profile 313 is the primary identity profile. In this case, Neil is the primary user of the electronic device, and the identity profile 313 may include restrictions on sharing the identity profile 313. In other embodiments, the each identity profile may include an additional field (not shown) that identifies the identity profile type as either primary or shared, and the type may be user selectable.

In the examples described in the present disclosure, the encryption performed is Advanced Encryption Standard 256-bit encryption (AES 256). The key 318 in the example is an AES 256 key, which may be stored in base64 format. However, in practice any suitable encryption method may be utilized, and the key 318 may be any suitable key suitable for the encryption method utilized.

Referring back to FIG. 2, determining the identity profile at 206 may be include, for example receiving a selection of an identity profile made by a user. For example, in response to receiving a selection of a content element, a menu may be displayed on the electronic device that includes a list of the identity profiles, or a portion of the identity profiles, stored on the electronic device. Selecting an identity profile may include performing authentication of the user of the electronic device by, for example, prompting the user to enter a password, or utilizing fingerprint or some other biometric verification.

In another example, determining the identity profile at 206 may be performed automatically such that the electronic device selects an identity profile. For example, an identity profile may be associated with the particular application to which the selected content element is associated. For example, if the selected content element is associated with a contacts application, it may be assumed that the information associated with the selected content element is intended to be accessible only by the primary user of the electronic device, and therefore the primary identity profile may automatically be selected. The identity profile associated with an application may be a default identity profile, which may be user configurable.

In another example, the identity profile may be automatically selected based on the identity profile included in encrypted information associated with other displayed content elements other than the selected content element. For example, in a text messaging application, previous messages of a displayed conversation thread may be encrypted. As noted above, the encrypted text includes the identifier associated with the identity profile. Therefore, determining the identity profile may include automatically selecting the identity profile associated with the identifier included in encrypted information displayed in other content elements other than the selected content element.

In another example, in a messaging context such as a text messaging application or an email application, the identity profile may be automatically selected based on recipient information associated with the message. For example, the message may be intended to be sent to a user associated with a particular email address or telephone number. In the case in which the identity profiles include contact information such as email addresses and telephone numbers, determining an identity profile may include selecting an identity profile having contact information that matches the recipient information of the message.

In the case in which an identity profile is automatically selected at 206, a user may override the automatically selected identity profile and select a different identity profile.

At 208, information associated with the selected content element is encrypted utilizing the encryption key associated with the identity profile determined at 206 to generate encrypted information.

The information associated with the content element may include, for example, text information, or any other information including files. The information that is encrypted may include information that was associated with the selected content element prior to the content element being selected, or may include information that is not associated with content element until after the content element is selected.

For example, the selected content element may be a text entry field. The information associated with the selected text entry field may include text that was entered into the text entry field prior to selection, or may include text that is entered into the text entry field after selection.

In an example, the information associated with the selected content element may be entered into a separate overlay window that is not accessible or associated with the application running on the application. For example, in response to selecting a content element, such as a text entry field, a separate window having its own input field may be displayed over the content elements of the application running on the electronic device. Text or other data, such as files, may be input into the input field of the window overlay, and this entered data is the information associated with the selected content element that is encrypted at 208.

In this way, the application running on the device does not have access to the information prior to encryption in order to improve security in the event that the application keeps a log or record of all information. In an example, a virtual keyboard that is separate from and inaccessible by the application running on the electronic device may also be displayed in addition to the overlay window in order to inhibit the application from logging the keystrokes when text is input into the input field of the overlay window. This example is described in more detail below with reference to FIG. 7.

In the case described above in which selecting a content element includes selecting a portion of the text or other information displayed in the content element, encrypting the information at 208 may include encrypting only the selected information, or may include encrypting all of the information displayed in the selected content element. For example, in the context of composing a message, such as a text message or an email message, only a portion of the message may include sensitive information. In this case, the user may have the option to encrypt only the sensitive portion of the message, by selecting the portion including sensitive information, but not encrypting the other portions that do not include sensitive information.

At 210, the encrypted data is displayed in the selected content element. Displaying the encrypted data may include replacing the information in the selected content element with the encrypted data. For example, if information that is encrypted at 208 was associated with the content element prior to the content element being selected, then the information may be replaced with the encrypted information.

However, if the information that is encrypted at 208 was not associated with the content element when the content element was selected, then the encrypted information may simply be added to the selected content element without replacing any information. For example, in the case in which information is input into an input field of an overlay window, as described above, then there may be no information displayed in the content element that needs to be replaced by the encrypted information.

Optionally at 212, the selected content element may be set as the default content element for the application. For example, if the selected content element is an text entry field for inputting a new message within a conversation thread in a text messaging application, a user may wish for that text entry field to be a default selected content element such that the user does not need to reselect the text entry field each time the user wishes to send a new message. Whether to set the selected content element as the default selected content element, or which content element is the default selected content element, may be user configurable.

Referring now to FIG. 4A through 4D, an example of encrypting information displayed on a touch-sensitive display 118 of an electronic device 100 is shown. In the example, the display 118 displays a conversation thread within a text messaging application that is running on the electronic device 100. The conversation thread includes messages sent between the user of the electronic device 100 and a contact, "Ben". In the example shown, the contact "Ben" of this conversation thread may be associated with the identity profile 306, having the title "Ben", shown in the example shown in FIG. 3A. In this example, the identity profile 306 has be shared between the electronic device 100 and an electronic device (not shown) associated with the contact Ben such that Ben is able to decrypt the received messages, is able to encrypt messages sent from the electronic device associated with Ben.

The displayed content elements of the text messaging application includes previously sent messages 402, 404 and a text entry field 406. The text messaging application also includes a virtual keyboard 408 is also displayed on the display 118 for inputting text into the text entry field 406.

In the example shown in FIG. 4A through 4D, the text "This is a secret message." has been input into the text entry field 406 via, for example, input received on the virtual keyboard 408. The previous messages 402, 406 in the example shown have been encrypted utilizing AES 256, however any encryption is possible.

In the AES 256 format utilized in the present examples, encrypted information has the following format: --pk2563zt3+RIZKMU2GimidKyUawOYw85Fv9kcG09--pk.

The encrypted text is identified by the starting and ending tags "--pk". The first four digits of the encrypted text after the starting tag, e.g., "2563" in the example shown, is the identifier of the identity profile that includes the encryption key utilized to encrypt the information. In the example shown, the identifier "2563" may be associated with the identity profile 306 shown in FIG. 3A, which includes the title "Ben". The identifier included in the encrypted text is utilized to determine which encryption key to utilize to decrypt the encrypted information, as described in more detail below.

Figure 4B:
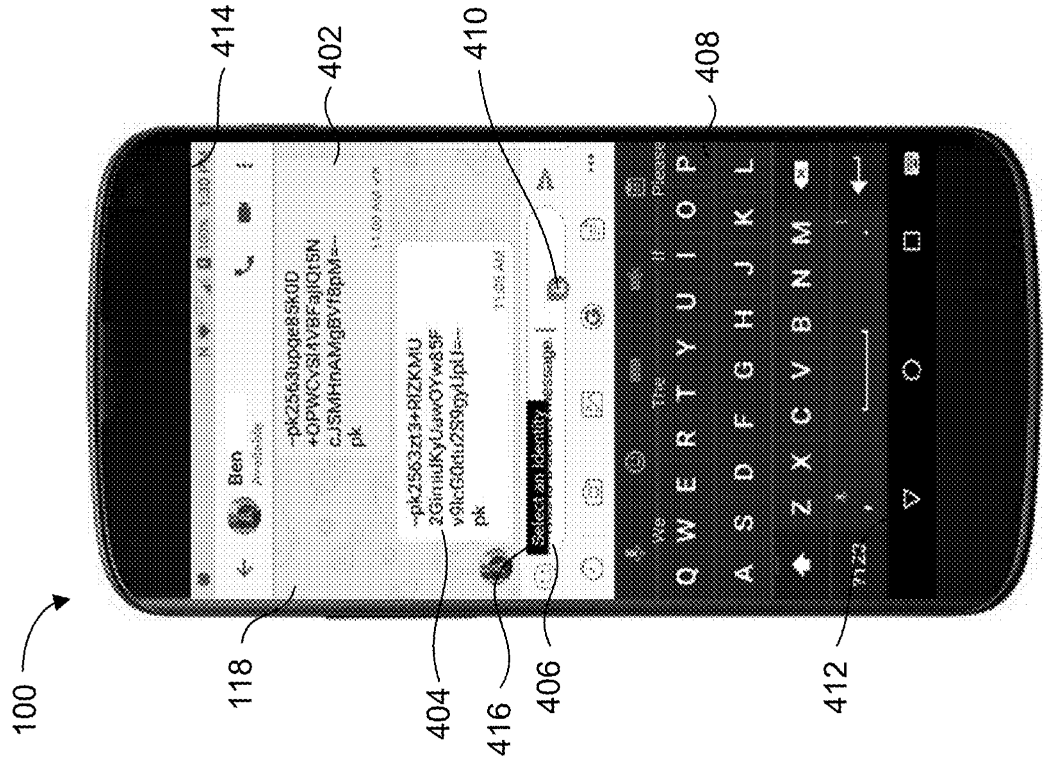
FIG. 4A through FIG. 7 illustrate examples of encrypting information in accordance with the disclosure.

In FIG. 4B, an icon 410 is displayed. The icon 410 may be displayed in response to a user input that, for example, initiates an encryption mode at the electronic device 100. The encryption mode may be initiated by any suitable method including, for example, making a selection to initiate encryption mode in a command menu. The command menu may be accessible by, for example, swiping up from a bottom edge 412 of the display 118 or swiping down from a top edge 414 of the display 118. In the example shown in FIG. 4B, the icon 410 has been dragged onto the text entry field 406 to select the text entry field 406 as the selected content element.

In the example shown in FIG. 4B, an identity profile menu 416 is displayed in response to selecting a content element. As shown in FIG. 4C, the identity profile menu 416 may be expanded to display a list 418 identity profiles stored in the electronic device 100. The identity profile menu 416 may be expanded by, for example, performing a tap gesture on the touch-sensitive display 118 at the location that the identity profile menu 416 is displayed. Selection of one of the identity profiles may be received in response to a tap gesture being performed at a location on the touch-sensitive display 118 in which that identity profile is displayed in the list 418.

Alternatively, or in addition to displaying the menu 416, an identity profile may automatically be selected as described above. For example, the identity profile 306 may be the default identity profile associated with the conversation thread between the user and the contact Ben. In another example, the identity profile 306 may be automatically selected by determining the identifier "2563" included in the encrypted information included in the previous messages 402, 404. In yet another example, the contact information associated with the contact "Ben" may be included in the identity profile 306, and this contact information is matched to recipient information of the conversation thread with Ben, resulting in the identity profile 306 being automatically selected. In an example, the automatically selected identity profile may be overridden by, for example, selecting another identity profile from the list 418.

When the identity profile has been selected, the information associated with the selected content element, in this case the text "This is a secret message." is encrypted utilizing the encryption key associated with the determined identity profile to generate the encrypted information 420. The encrypted information 420 is displayed on the display 118. In the example shown, displaying the encrypted information 420 includes replacing the original text, "This is a secret message.", in the text entry field 406 with the encrypted information 420.

Figure 4A:
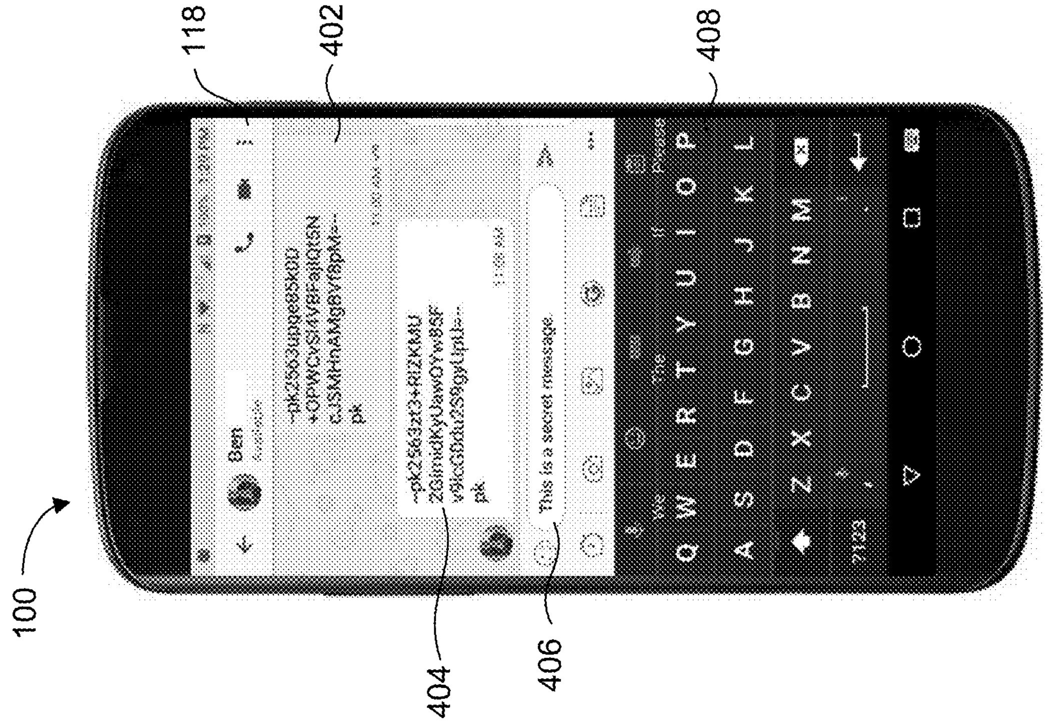
Figure 4D:
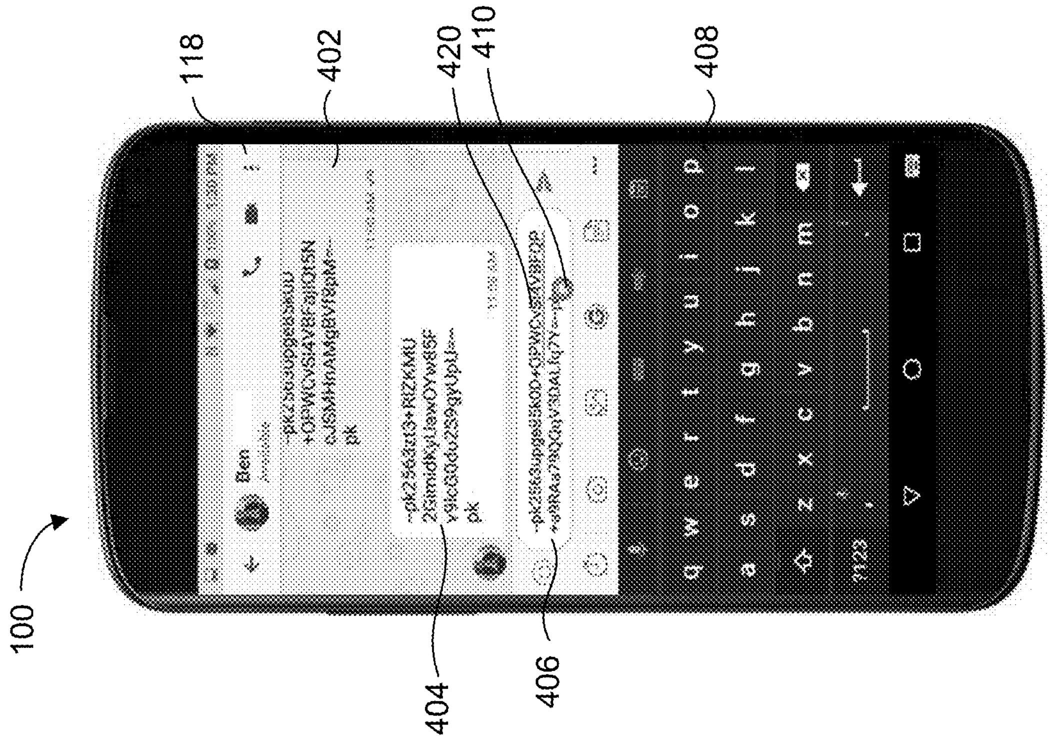
Figure 5B:
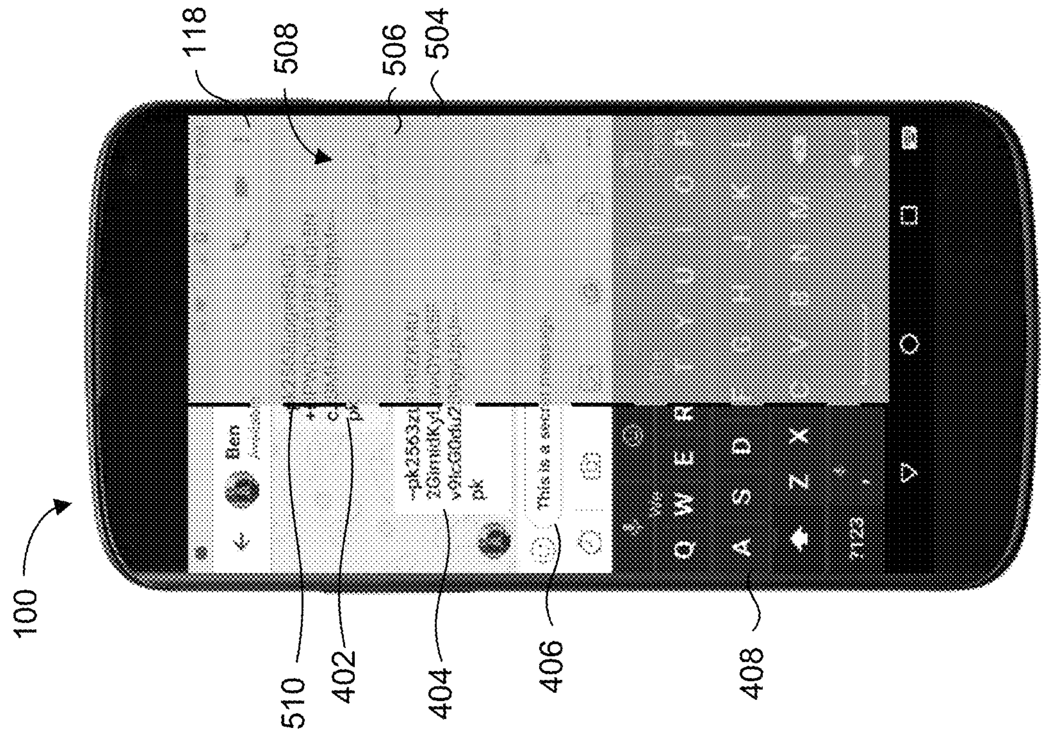
Figure 5A:
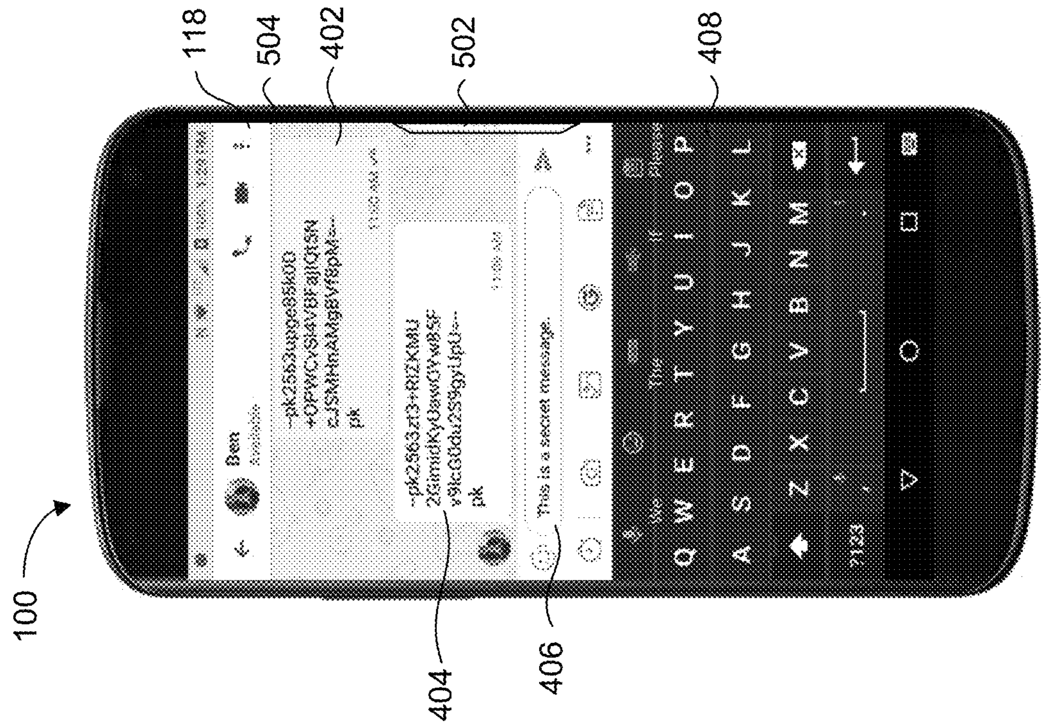

Referring to FIGS. 5A and 5B, an alternative method for selecting a content element displayed on a touch-sensitive display 118 of an electronic device 100 is shown. The touch-sensitive display 118 of the electronic device 100 shown in FIGS. 5A and 5B displays the conversation thread of the text messaging application shown in FIG. 4A. However, instead of displaying an icon 410, the example shown in FIG. 5A includes a filter tab 502 displayed at the edge 504 of the touch-sensitive display 118. The filter tab 502 may be displayed, for example, in response to the electronic device 100 entering an encryption mode, similar to the display of the icon 410 shown in FIG. 4B.

The user may perform a swipe or drag gesture beginning at the filter tab 502 and moving away from the edge 504, which may cause a filter 506 to be displayed on the touch-sensitive display 118 such that the filter 506 appears to be dragged out by the gesture. The filter 506 defines a region 508 that extends from the edge 510 of the filter to the edge 504 of the touch-sensitive display 118. The content elements that are selected may be any content element that is at least partially within the region 508, or may be only those content elements that are fully within the region 508.

In the example shown, previous messages 402, 404 and the text entry field 406 are all partially within the region 508. In this example, the text entry field 406 may be selected, and the text, "This is a secret message.", included within the text entry field 406 may be encrypted, similar to the encryption performed in the example described with reference to FIG. 4A through 4B.

In addition, previous messages 402, 404 are partially within the region 508 and may also be selected. Because the previous messages 402, 404 include information that is already encrypted, the encrypted information may be decrypted in response to being selected, as described in more detail below with reference to FIG. 8. The decrypted information may be displayed over top of the respective previous message 402, 404. The decrypted information may be displayed only within the region 508 such that, when the previous messages 402,404 are partially located within the region 508, the decrypted information appears to be revealed as the filter 506 is moved over each of the previous messages 402, 404. By expanding or contracting the filter 508, a user may control what region of the screen is subject to encryption or decryption in an intuitive manner.

In other examples, the filter tab 502 may not be displayed on the touch-sensitive display 118, and the filter 506 may be dragged from the edge 504 by a swipe or drag gesture beginning near, i.e., within a predetermined distance, of the edge 504 and moved away from the edge 504. In another embodiment, the filter 506 may not be displayed on the touch-sensitive display 118 at all. In this example, the region 508 may be not defined with respect to a filter 504, but is defined by the distance that the swipe gestures moves from the edge 504 in the same manner as previously described when the filter 506 is displayed.

Although FIGS. 5A and 5B show the filter 506 extending from an edge 504 on the right-hand side of the touch-sensitive display 118, as viewed in the orientation shown in FIGS. 5A and 5B, in other examples, any other edge of the display 118 may alternatively, or additionally, be utilized to define the region 508.

Figure 6:
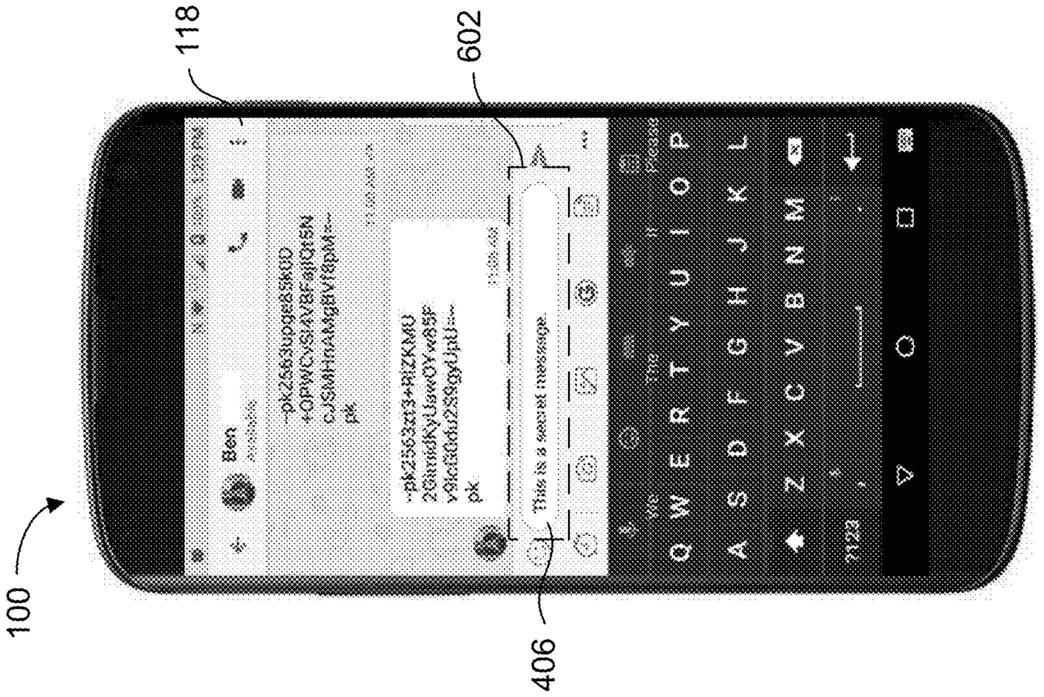

Referring now to FIG. 6, another example of selecting a content element displayed on a touch-sensitive display 118 of an electronic device 100 is shown. The touch-sensitive display 118 of the electronic device 100 shown in FIG. 6 displays the conversation thread of the text messaging application shown in FIG. 4A. In the example shown in FIG. 6, a region 602 has been defined on the touch-sensitive display 118. Similar to the region 508, described with reference to FIG. 5B, content elements within the region 602, either fully or partially, may be selected content elements. In the example shown in FIG. 6, the text entry field 406 is within the region 602, and is selected. The text, "This is a secret message." included within the selected text entry field 406 may be encrypted as described above with reference to FIG. 4A through 4D.

The region 602 may be defined on the touch-sensitive display 118 in any suitable manner. For example, the region may be defined by a pinching gesture performed on the touch-sensitive display 118 such that the locations of the two touches of the pinching gesture define opposing corners of a rectangular region 602. The region 602 may be defined by performing a predetermined gesture or input after, for example, the electronic device 100 has entered an encryption mode.

Figure 7:
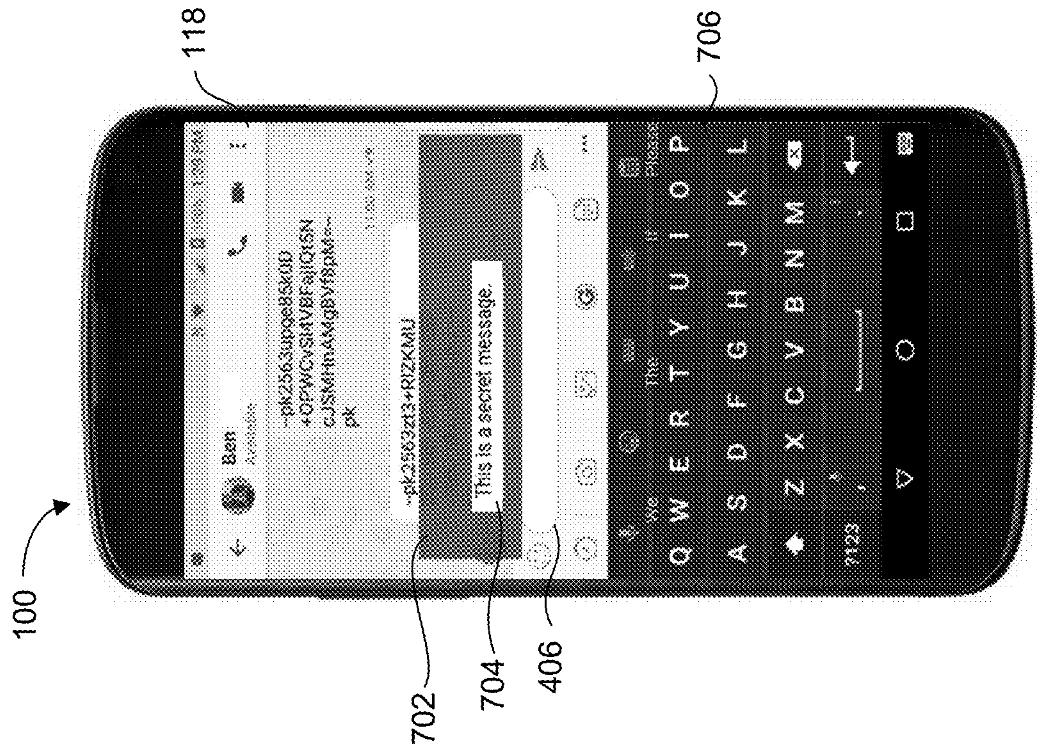

Referring now to FIG. 7, an example in which information associated with a selected content element is entered in a separate overlay window is shown. The touch-sensitive display 118 of the electronic device 100 shown in FIG. 7 displays the conversation thread of the text messaging application shown previously in FIG. 4A. In the example shown in FIG. 7, an overlay window 702 is displayed on the touch-sensitive display 118. The overlay window 702 may be displayed in response to receiving a selection of the text entry field 406 as the selected content element.

The overlay window 702 may be separate from the application running on the electronic device 100, in this example the text messaging application. The overlay window 702 includes an entry field 704 for entering information to be associated with a selected content element, in this example the text entry field 406 associated with the text messaging application. In the example shown, the text "This is a secret message." is entered into the entry field 704.

Text or other information, such as files, that is entered in the entry field 704 may be inaccessible by the application because the overlay window 702 is separate from the application running on the electronic device 100. The information that is entered in the entry field 704 is encrypted to generate the encrypted information, as described above, and the encrypted information may be entered into the text entry field 406.

Figure 4C:
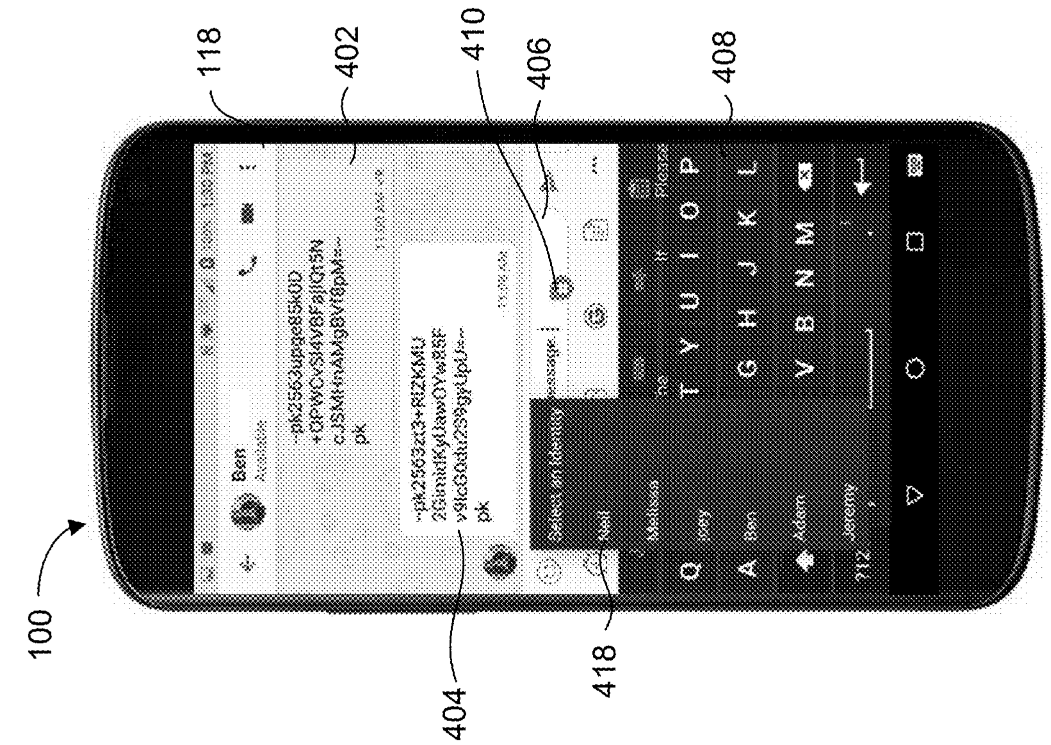

In addition, a virtual keyboard 706 may be displayed in place of the virtual keyboard 408 that is displayed in the example shown in FIG. 4A. The virtual keyboard 706 is associated with the overlay window 702 and is not associated with or accessible by the application running on the electronic device 100 such that the application is not able to monitor keystrokes when entering text into the entry field 704.

For example, some applications may log or otherwise store all data entered into the application, whether that information is transmitted or otherwise stored on the electronic device 100. Entering all data into an overlay window 702 and by utilizing a separate virtual keyboard 706 for text entry, inhibits an application from accessing unencrypted information, thereby further increasing security of sensitive information.

Figure 8:
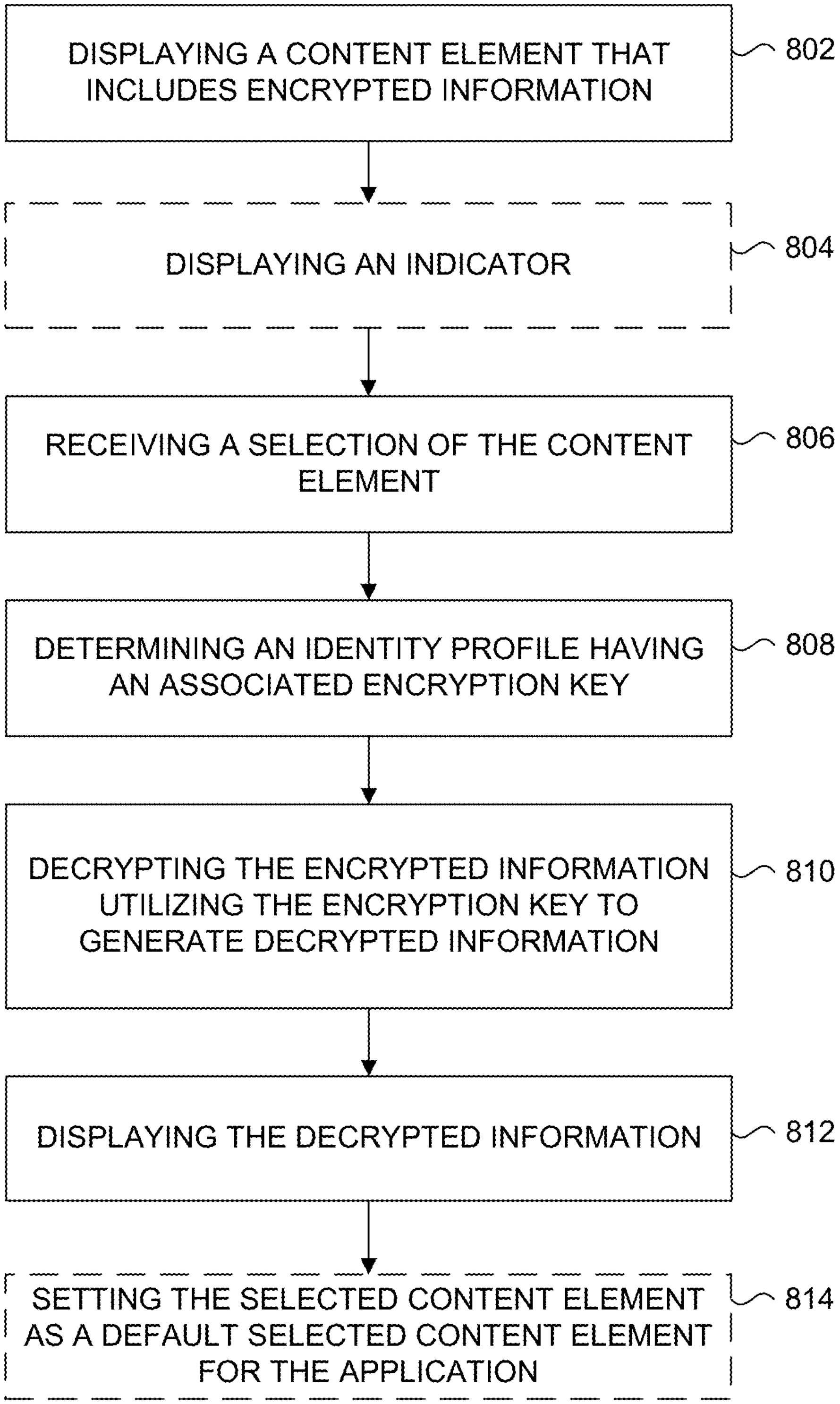
FIG. 8 is a flowchart illustrating a method of decrypting information in accordance with the present disclosure.

Referring now to FIG. 8, a flowchart illustrating a method of encrypting information displayed on an electronic device, such as the portable electronic device 100, is shown. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor, such as the processor 102, of the portable electronic device to perform the method may be stored in a computer-readable storage medium, such as a non-transitory computer-readable medium. The computer-readable code may be incorporated into the operating system, such as operating system 146, or may be incorporated into a standalone application, such as one of the programs 148, or may be a functionality built into a secured vault on the electronic device, such as a secured password database.

At 802, a content element that includes encrypted information is displayed on a display of an electronic device. Displaying the content element including may be similar to displaying the encrypted information at 210 as described above with reference to FIG. 2, or may be similar to displaying the previous messages 402, 404 described above with reference to FIG. 4A.

Optionally at 404, displaying the content element including encrypted data at 802 may include displaying an indicator in association with the encrypted data. The indicator may be, for example, an icon or an emoji that is inserted into the encrypted text, or is displayed proximate to the encrypted text, to indicate to a user, such as the recipient of an encrypted text message, that the information contained in the message is encrypted.

At 806, a selection of the content element is received. Receiving the selection of the content element may be performed similar to receiving the selection of a content element at 204 as described above with reference to FIG. 2, or similar to any of the examples of selecting a content element described above with reference to FIG. 4A through 6, and therefore is not further described here to avoid repetition. Selecting a content element may include performing authentication of the user of the electronic device by, for example, prompting the user to enter a password, or utilizing fingerprint or some other biometric verification, before the encrypted information associated with the selected content element is decrypted.

At 808, an identity profile having an associated encryption key is determined. The identity profile may be determined by based on an identifier that is included within the encrypted information and that is associated with the identity profile, as described previously.

At 810, the encrypted information is decrypted utilizing the encryption key associated with the determined identity profile to generate decrypted information.

At 812, the decrypted information is displayed on the display of the electronic device. In an example, the decrypted information is displayed in an overlay window that is separate from, and inaccessible by, the application running on the electronic device. Displaying the decrypted information in an overlay window increases security of the decrypted information by not giving the application access to the decrypted information, as described above with reference to FIG. 7.

In another example, the decrypted information is displayed by replacing the encrypted information in the selected content element with the decrypted information. For example, when the selected content element is a text entry field and the user wishes to edit the information entered into the text entry field, it may be desirable to enter the decrypted information into the text entry field to facilitate editing the information.

In an example, the decrypted information may be displayed in an overlay window by default, and entered into the selected content element in response to receiving a further input. The further input may be any suitable input such as, for example, a tap gesture or a double-tap gesture performed at the location of the selected content element or the overlay window.

If, for example, the content element is selected utilizing an icon, such as icon 410 described above with reference to FIG. 4B through 4D, the decrypted information may be entered into the selected content element in response to a tap or double-tap gesture performed on the icon, whereas merely dragging the icon to the content element, or hovering the icon over the content element, may cause the decrypted information to be displayed in an overlay window.

Optionally at 814, the selected content element may be set as a default selected content element for the application running on the electronic device. Setting the selected content item as a default selected content item for the application may be similar to 212 described above with reference to FIG. 2. For example, in the context of a text messaging application, a user may define a region of the display, similar to regions 508 and 602 described above with reference to FIGS. 5B and 6, respectively, that covers the upper of the display in which previously sent messages are displayed. In this example, at 212 may cause any content elements displayed this upper portion of the display, i.e., the previously displayed messages, to be selected by default and decrypted without the user having to reselect the previously sent messages.

Figure 9A:
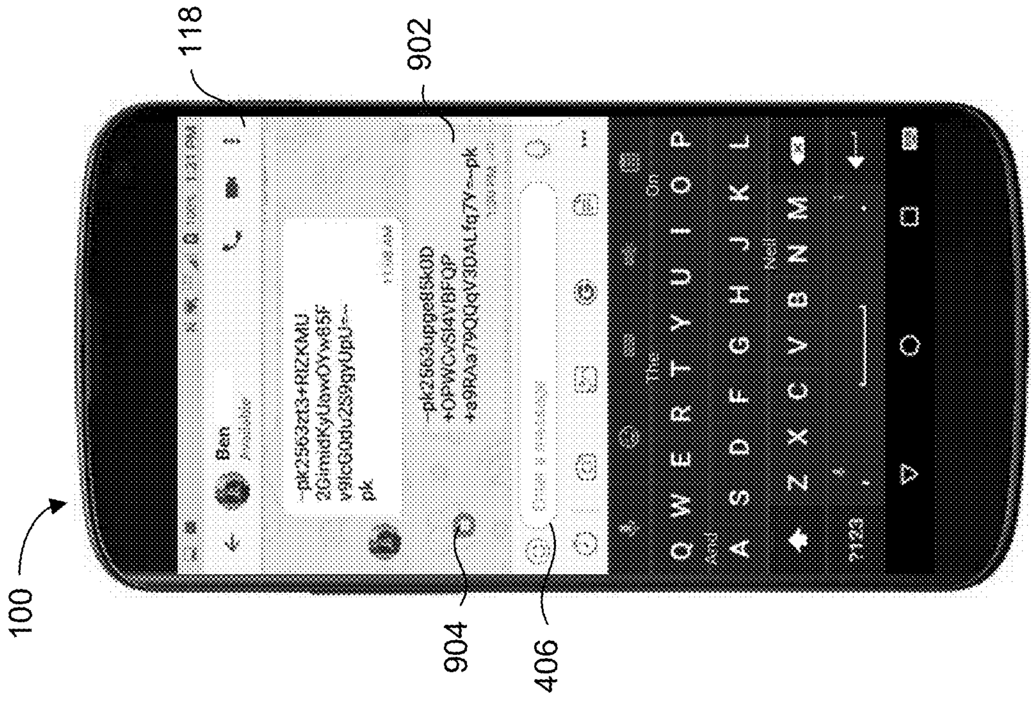
FIG. 9A through 10C illustrate examples of decrypting information in accordance with the disclosure.
Figure 9B:
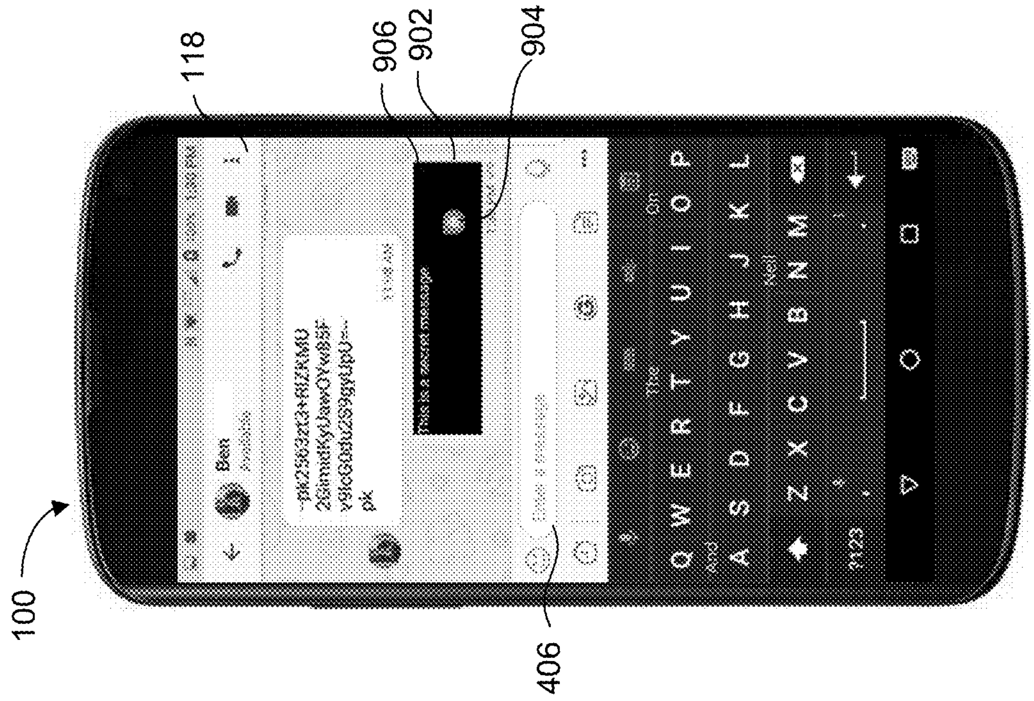

Referring now to FIGS. 9A and 9B, an example of displaying decrypted information in an overlay window is shown. The touch-sensitive display 118 of the electronic device 100 shown in FIG. 7 displays the conversation thread of the text messaging application shown previously in FIG. 4D after the encrypted information included in the text entry field 406 has been sent. The encrypted information now appears in a previously sent message 902.

In the example shown, an icon 904 is displayed on the touch-sensitive display 118. As described above, the icon 904 may be dragged onto a displayed content element in order to select the content element. FIG. 9B shows that the icon 904 has been dragged onto the previous message 902, selecting the previous message 902. In response to selecting the previous message 902, the encrypted information associated with the previous message 902 is decrypted to generated decrypted information, which is displayed in an overlay window 906. As described above, the encrypted information is decrypted utilizing the encryption key associated with the identifier "2563" that is included in the encrypted information included in the previous message 902, which corresponds to the identity profile 306 associated with the contact "Ben".

Figure 10C:
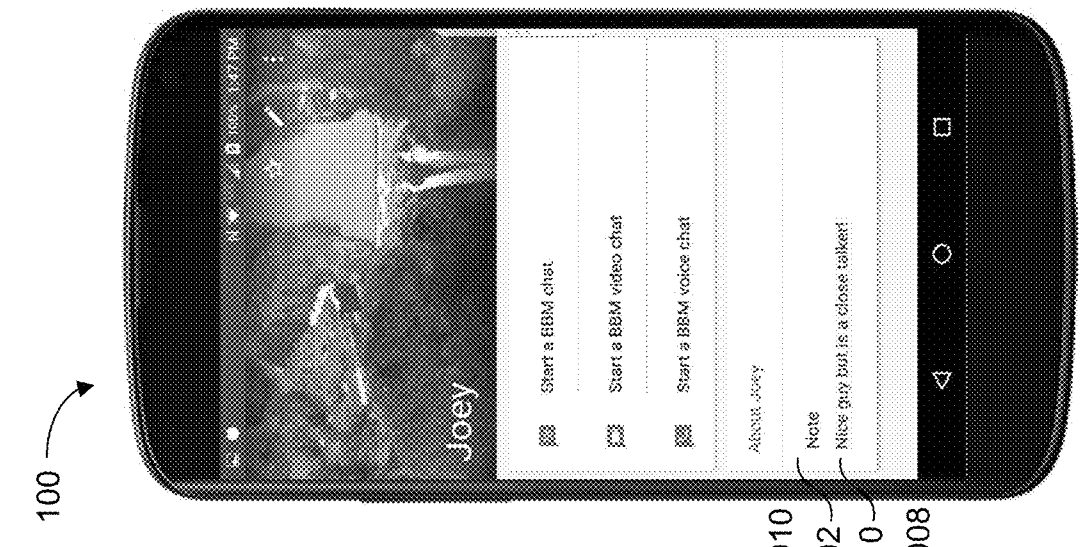
Figure 10B:
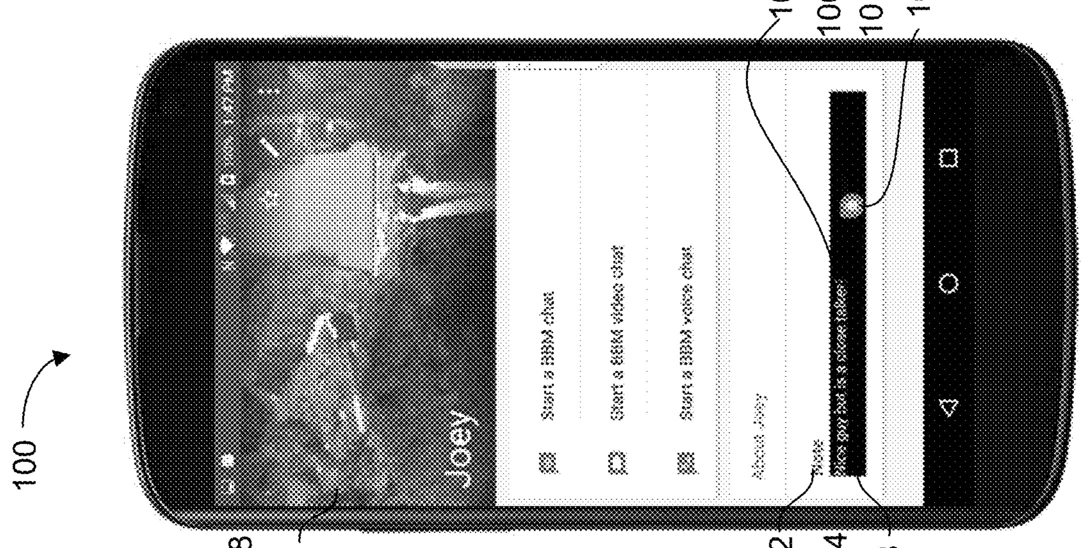
Figure 10A:
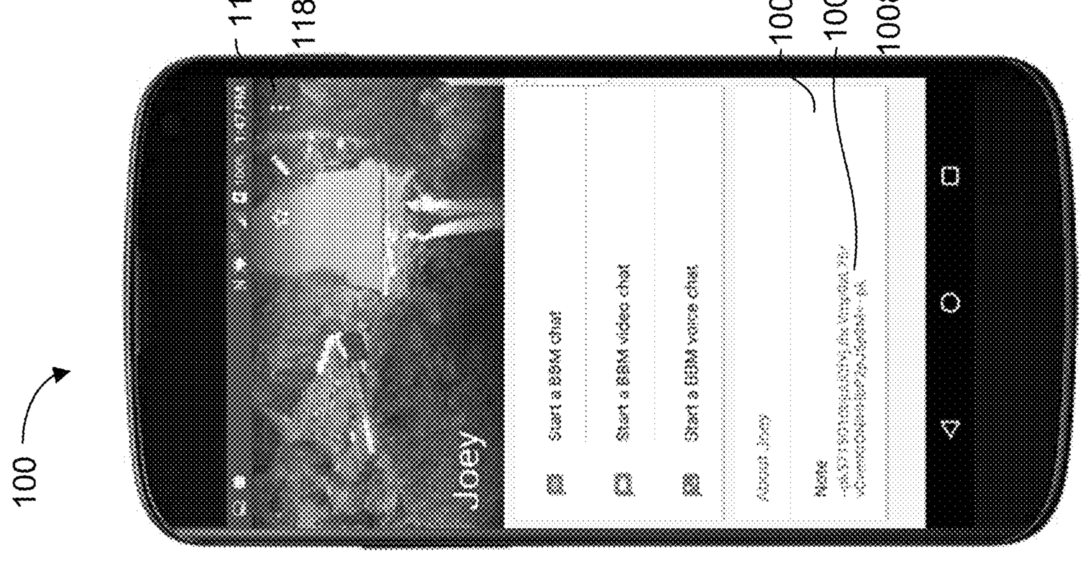

Referring now to FIG. 10A through 10C, another example of displaying decrypted information is shown. In the example shown in FIG. 10A through 10C, the application that is running on the electronic device 100 is a contacts application. A particular contact profile associated with a contact "Joey" is displayed on the touch-sensitive display 118 of the electronic device 100. The contact profile includes a content element 1002 titled "Note". The content element 1002 includes encrypted information 1004. The first four digits, "5715" after the "--pk" beginning tag indicates the identifier of the identity profile associated with the encryption key utilized to generate the encrypted information.

In FIG. 10B, an icon 1006 has been dragged over the content element 1002 to select the content element 1002. In response to selecting the content element 1002, the encrypted information 1004 is decrypted utilizing the encryption key associated with the determined identity profile, i.e., the identity profile having the identifier "5715", to generate the decrypted information 1010, "Nice guy but is a close talker!". In example shown in FIG. 10B, the icon 1006 has merely been dragged over the content element 1002, and therefore the decrypted information is displayed in an overlay window 1008.

In FIG. 10C, a further input has been received such as, for example a tap or a double-tap gesture on the icon 1006. In response to receiving the further input, the encrypted information 1004 in the content element 1002 is replaced with the decrypted information 1010. Entering the decrypted information 1010 directly into the content element 1002 facilitates editing the decrypted information. Once edited, the information may be encrypted again, as described previously.

Although the above examples described with reference to FIGS. 4A through 7 and 9A through 10C are of an electronic device 100 having a touch-sensitive display 118, it is understood that the examples also apply to electronic devices that include displays that are not touch-sensitive. For example, rather than receiving gesture inputs from a touch-sensitive display, the various inputs may be received any suitable input device such as, for example, the navigation device 140 of the electronic device 140.

Disclosed herein are electronic devices and methods for encrypting and decrypting information displayed on a display of an electronic device. Advantageously, encryption and decryption may be performed on data that is associated with an application that does not itself include encryption functionality. Further, the method facilitates encrypting and decrypting across multiple applications utilizing a single identity profile, facilitating utilizing a single set of shared credentials to be used to share encrypted information across multiple applications and platforms. Further, by entering information for encryption and displaying decrypted information in an overlay window that is separate and inaccessible by an application, security of sensitive information may be increased by inhibiting access by applications to unencrypted data.

The scope of the claims should not be limited by the preferred embodiments set forth in the examples, but should be given the broadest interpretation consistent with the description as a whole.

What is claimed is:

1. A method of encrypting information on an electronic device, the method comprising:

displaying content elements associated with an application running on the electronic device on a display of the electronic device, the content elements being separately displayed components of the application;

receiving a selection of a content element associated with the application running on the electronic device;

determining an identity profile having an associated key;

encrypting all of the information associated with the selected content element utilizing the key associated with the determined identity profile to generate encrypted information;

displaying the encrypted information in the selected content element;

wherein:

the selected content element comprises a text entry field associated with the application running on the electronic device;

encrypting information associated with the selected content element comprises:

displaying a second text entry field in an overlay window that is separate from the application running on the electronic device such that text entered into the second text entry field is not accessible by the application;

receiving text input in the second text entry field;

encrypting the text input received in the second text entry field to generate the encrypted information; and displaying the encrypted information comprises entering the encrypted information into the text entry field associated with the application running on the electronic device.

2. The method of claim 1, wherein determining an identity profile comprises receiving a selection of an identity profile.

3. The method of claim 1, wherein determining an identity profile comprises automatically determining an identity profile.

4. The method of claim 3, wherein automatically determining an identity profile comprises:

determining at least a second content element associated with the application running on the electronic device that includes second encrypted information and that is other than the selected content element;

determining a second identity profile associated with a second key utilized to encrypt the second encrypted information; and automatically selecting the second identity profile as the determined identity profile.

5. The method of claim 3, wherein automatically determining an identity profile comprises selecting a default identity profile associated with the application running on the electronic device.

6. The method of claim 1, further comprising displaying an icon on the display of the electronic device, and wherein selecting a content element comprises:

receiving an input dragging the icon to a location on the display, the input comprising a touch gesture or a cursor that is separate from the icon that drags the icon; and determining a content element in the vicinity of the location on the display.

7. The method of claim 1, further comprising:

in response to receiving the selection of the content element, displaying a menu on the display including a selectable feature associated with performing encryption; and wherein encrypting all of the information associated with the selected content element is performed in response to receiving a selection of the selectable feature associated with performing encryption.

8. The method of claim 1, wherein selecting a content element comprises:

receiving a selection of a region of the display; and selecting the content elements that are at least partially displayed within the region.

9. The method of claim 8, wherein receiving a selection of a region comprises:

receiving a sliding gesture starting near an edge of the display and moving away from the edge;

displaying on the display a filter that is dragged from the edge with the sliding gesture, the filter defining the selected region of the display as being the portion of the display from the edge of the display to the location where the sliding gesture ends.

10. The method of claim 8, further comprising saving the selected region such that content elements displayed within the selected region are determined to be selected content elements without receiving further selection when subsequent content elements are displayed when the application is running on the electronic device.

11. An electronic device for encrypting information, the electronic device comprising:

a display for displaying information;

a processor operably coupled to the display and configured to:

display content elements associated with an application running on the electronic device on the display, the content elements being separately displayed components of the application;

receive a selection of a content element associated with the application running on the electronic device, wherein the selected content element comprises a text entry field associated with the application running on the electronic device;

determine an identity profile having an associated key;

encrypt all of the information associated with the selected content element utilizing the key associated with the determined identity profile to generate encrypted information;

display on the display the encrypted information in the selected content element;

wherein the processor being configured to encrypt information associated with the selected content element comprises the processor being configured to:

display a second text entry field in an overlay window that is separate from the application running on the electronic device such that text entered into the second text entry field is not accessible by the application;

receive text input in the second text entry field;

encrypt the text input received in the second text entry field to generate the encrypted information; and wherein the processor being configured to display the encrypted information comprises the processor being configured to enter the encrypted information into the text entry field associated with the application running on the electronic device.

12. The electronic device of claim 11, wherein the processor being configured to determine an identity profile comprises the processor being configured to receive a selection of an identity profile.

13. The electronic device of claim 11, wherein the processor being configured to determine an identity profile comprises the processor being configured to automatically determine an identity profile.

14. The electronic device of claim 13, wherein the processor being configured to automatically determine an identity profile comprises the processor being configured to:

determine at least a second content element associated with the application running on the electronic device that includes second encrypted information and that is other than the selected content element;

determining a second identity profile associated with a second key utilized to encrypt the second encrypted information; and automatically select the second identity profile as the determined identity profile.

15. The electronic device of claim 13, wherein the processor being configured to automatically determine an identity profile comprises the processor being configured to select a default identity profile associated with the application running on the electronic device.

16. The electronic device of claim 11, wherein the processor is further configured to display an icon on the display of the electronic device, and wherein the processor being configured to select a content element comprises the processor being configured to:

receive an input dragging the icon to a location on the display, the input comprising a touch gesture or a cursor that is separate from the icon that drags the icon; and determine a content element in the vicinity of the location on the display.

17. The electronic device of claim 11, wherein the processor is further configured to, in response to receiving the selection of the content element, display a menu on the display including a selectable feature associated with performing encryption, and wherein the processor being configured to receive an input to encrypt the selected text comprises the processor being configured to receive a selection of the selectable feature associated with performing encryption.

18. The electronic device of claim 11, wherein the processor being configured to select a content element comprises the processor being configured to:

receive a selection of a region of the display; and select the content elements that are at least partially displayed within the region.

19. The electronic device of claim 18, wherein the display comprises a touch-sensitive display and wherein the processor being configured to receive a selection of a region comprises the processor being configured to:

receive a sliding gesture starting near an edge of the display and moving away from the edge;

display on the display a filter that is dragged from the edge with the sliding gesture, the filter defining the selected region of the display as the portion of the display from the edge of the display to the location where the sliding gesture ends.

20. The electronic device of claim 18, wherein the processor is further configured to save the selected region such that content elements displayed within the selected region are determined to be selected content elements without a further selection being received when subsequent content elements are displayed when the application is running on the electronic device.

21. A method of decrypting information on an electronic device, the method comprising:

displaying a content element associated with an application running on the electronic device, the content element including encrypted information;

receiving a selection of the content element;

determining an identity profile having an associated key;

decrypting the encrypted information utilizing the key associated with the determined identity profile to generate decrypted information;

displaying the decrypted information in an overlay window that is separate from the application running on the electronic device such that the decrypted information is not accessible by the application.

22. The method of claim 21, wherein receiving a selection of the content element comprises receiving a hover-over input at a location of the display associated with the content element.

23. The method of claim 21, further comprising:

receiving a further input to enter the decrypted text in the selected content element, and in response to receiving the further input, replacing the displayed encrypted information associated with the selected content element with the decrypted information.

24. The method of claim 21, wherein the encrypted information includes an identifier associated with an identity profile, and wherein determining the identity profile comprises automatically selecting the identity profile associated with the identifier.

25. The method of claim 21, further comprising displaying an icon on the display of the electronic device, and wherein selecting a content element comprises:

receiving an input dragging the icon to a location on the display, the input comprising a touch gesture or a cursor that is separate from the icon that drags the icon; and determining a content element in the vicinity of the location on the display as the selected content element.

26. The method of claim 21, wherein selecting a content element comprises:

receiving a selection of a region of the display; and selecting the content elements that are at least partially displayed within the region.

27. The method of claim 26, wherein receiving a selection of a region comprises:

receiving a sliding gesture starting near an edge of the display and moving away from the edge;

displaying on the display a filter that is dragged from the edge with the sliding gesture, the filter defining the selected region of the display as being the portion of the display from the edge of the display to the location where the sliding gesture ends.

28. An electronic device for decrypting information, the electronic device comprising:

a display to display information;

a processor operably coupled to the display and configured to:

display a content element associated with an application running on the electronic device, the content element including encrypted information;

receive a selection of the content element;

determine an identity profile having an associated key;

decrypt the encrypted information utilizing the key associated with the determined identity profile to generate decrypted information;

display the decrypted information in an overlay window that is separate from the application running on the electronic device such that the decrypted information is not accessible by the application.

29. The electronic device of claim 28, wherein the processor being configured to receive a selection of the content element comprises the processor being configured to receive a hover-over input at a location of the display associated with the content element.

30. The electronic device of claim 28, wherein the processor is further configured to:

receive a further input to enter the decrypted text in the selected content element, and in response to the receipt of the further input, replace the displayed encrypted information associated with the selected content element with the decrypted information.

31. The electronic device of claim 28, wherein the encrypted information includes an identifier associated with an identity profile, and wherein the processor being configured to determine an identity profile comprises the processor being configured to automatically select the identity profile associated with the identifier.

32. The electronic device of claim 28, wherein the processor is further configured to display an icon on the display of the electronic device, and wherein the processor being configured to select a content element comprises the processor being configured to:

receive an input dragging the icon to a location on the display, the input comprising a touch gesture or a cursor that is separate from the icon that drags the icon; and determine a content element in the vicinity of the location on the display as the selected content element.

33. The electronic device of claim 28, wherein the processor being configured to select a content element comprises the processor being configured to:

receive a selection of a region of the display; and select the content elements that are at least partially displayed within the region.

34. The electronic device of claim 33, wherein the display comprises a touch-sensitive display, and wherein receiving a selection of a region comprises:

receiving a sliding gesture starting near an edge of the display and moving away from the edge;

displaying on the display a filter that is dragged from the edge with the sliding gesture, the filter defining the selected region of the display as being the portion of the display from the edge of the display to the location where the sliding gesture ends.

* * * * *